M. KING.
CLOVER HULLER.
APPLICATION FILED MAR. 18, 1912.
1,041,809.
Patented Oct. 22, 1912.
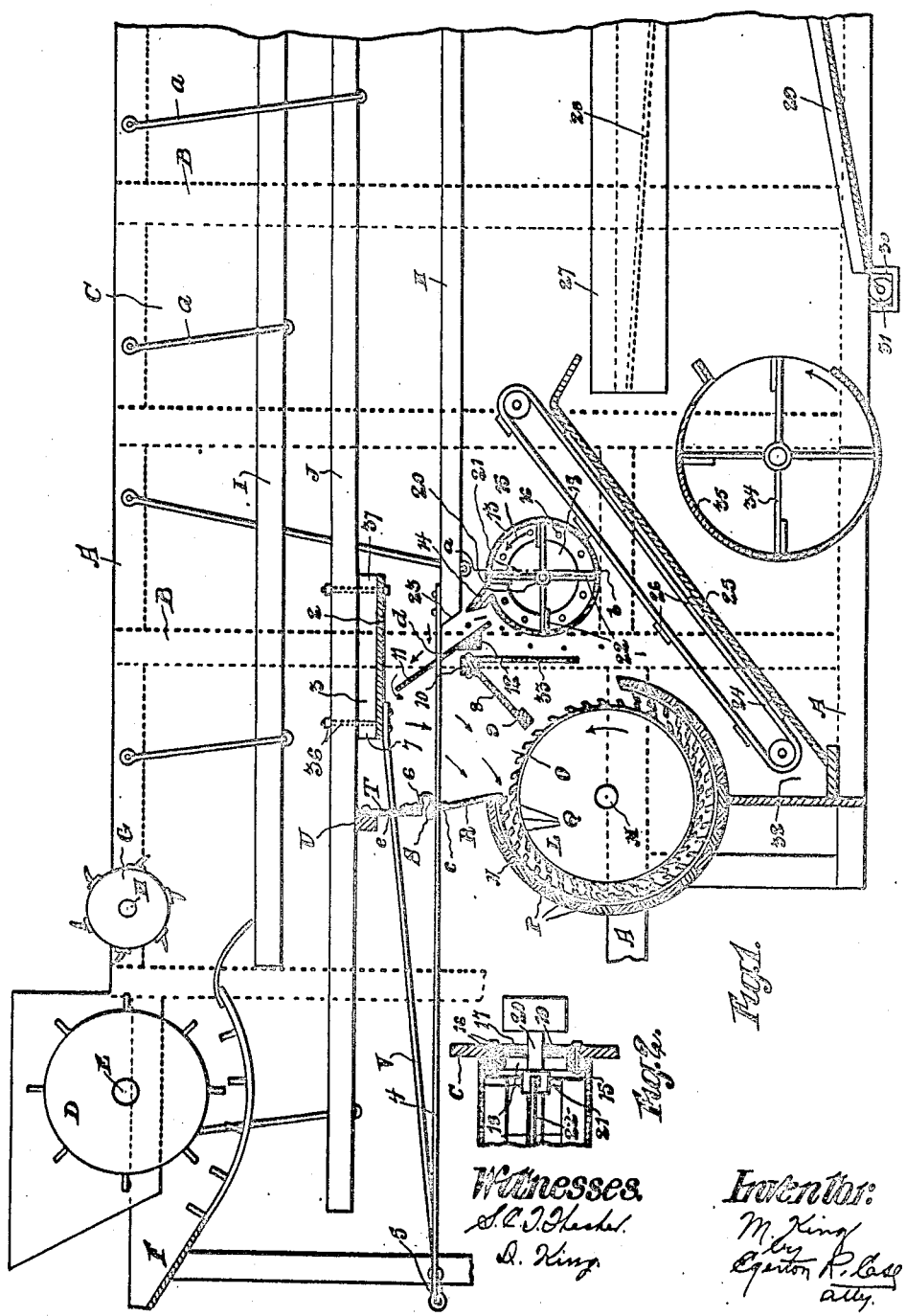

UNITED STATES PATENT OFFICE.

MARMADUKE KING, OF FINGERBOARD, ONTARIO, CANADA.

CLOVER-HULLER.

1,041,809.  Specification of Letters Patent.  Patented Oct. 22, 1912.

Application filed March 18, 1912. Serial No. 684,421.

*To all whom it may concern:*

Be it known that I, MARMADUKE KING, a subject of the King of Great Britain, residing at the hamlet of Fingerboard, in the county of Victoria and Province of Ontario, Canada, have invented certain new and useful Improvements in Clover-Hullers, of which the following is a specification.

My invention relates to improvements in clover hullers, and the object of my invention is to remove refractory bodies, such as stone and iron, from unhulled clover seeds, and my invention will be hereinafter particularly set forth and described, and what I claim as new will be pointed out in the claims forming part of the specification.

Figure 1 is a vertical longitudinal section through portion of an ordinary clover huller, certain parts being shown in side elevation, and Fig. 2 is a vertical section on the line $a-b$ Fig. 1 taken longitudinally through one end of portion of a fan or blower, showing how the same is supported and constructed to allow air to pass thereinto.

In the drawings like characters of reference indicate corresponding parts in each figure.

It must be understood that my invention is not confined to use with the type of clover huller illustrated.

It is well-known that small stones and pieces of iron often pass along with the unhulled clover seeds into the huller, resulting in more or less damage to the same.

The broad conception of my invention consists in passing a current of air, regulated to the weight of the hulled clover seeds into or through a quantity of the same, as it leaves the conveyer, the seeds being carried away by the current of air, and the refractory bodies being removed by gravity, means being provided for carrying away the current of air after it has conveyed or lifted the unhulled seeds to the huller.

In the embodiment illustrated of my invention, as the unhulled seed leaves the conveyer, it is blown by the current of air against a plate supported at an angle, over which it escapes into the huller, the refractory bodies passing by gravity down below said plate.

Fig. 1 illustrates part of the front portion of the frame of a well-known clover huller, and this frame is composed of a plurality of horizontal sills A, connected to a plurality of uprights B.

C is any suitable sheathing secured to the inner sides of the sills A and uprights B.

D is the cylinder mounted by its shaft E on any suitable bearings (not shown), and F is the throat into which the clover is fed. G is any suitable beater the shaft H of which is mounted in any suitable bearings, not shown. The said cylinder and beater pass the clover on to the straw-rack I which is operated back and forth by well-known means not necessary to illustrate. The material not disposed of by the straw-rack passes therethrough onto a stemmer J positioned underneath the straw rack I, the material not disposed of by the said stemmer passing therethrough onto the conveyer K.

L is the huller, of any suitable construction, and the shaft M thereof is mounted in any suitable bearings not necessary to illustrate. Surrounding the huller L is a drum N having an opening O in its side of the desired width, and extending from one end of the drum to the other. As is usual, the inner side of the drum N is provided with a plurality of rasps P which coact with a plurality of rasps Q carried by the huller L.

R is a plate secured to the drum N and projecting a suitable distance thereabove, and extending from one side of the machine to the other. The upper end of this plate R is secured to a support S, secured at each end to the sides of the machine.

T is a plate secured by the support U to the stemmer J and depending therebelow. The said stemmer is reciprocated horizontally by means of the rod V secured to the bottom 2 of the air-box 3. 4 is a rod connected to the conveyer K, and by means of the well-known double crank lever 5, the said rods V and 4 are reciprocated to move their connected parts. Since the plate T coacts with the plate R, these members are connected together by a strip of canvas 6 or other suitable flexible material which will permit of the movement of the plate T and will enable it to coact with the plate R so as to form the front wall of an air-chamber 7 leading directly to the opening O, and of equal length therewith.

8 is a plate extending the full width of the machine and secured at its lower end to the support 9 secured to the sides of the machine. The upper end of this plate is secured to a support 10 suitably secured to each side of the machine.

11 is a plate extending the full width of the machine and secured to the support 12 supported at both ends by the machine-frame.

The plates R and T form one side of the hopper leading to the huller, and the plates 8 and 11 form the other side of the said hopper.

13 is a drum extending for the full width of the machine, the same being provided on one side and for its whole length with a spout 14.

15 are rings around which each end of the drum is secured, and these rings (only one of which is shown) are secured by the nuts and bolts designated by the common numeral of reference 16 to the sheathing C. The said sheathing C is provided with an opening 17 of the same size and in alinement with the opening 18 formed in the rings 15.

19 are any suitable spiders carried by the frame of the machine in which has bearing the shaft 20 on which is mounted the arms 21 of bars 22 forming a blower or fan. At each forward movement of the conveyer K, the unhulled clover seed is thrown over the front end 23 thereof into the current of air escaping through the spout 14 between the plate 11 and the said front end 23 of the conveyer K. Naturally the unhulled clover seed is blown up the plate 11 and it comes into contact with the bottom 2 of the air-box 3, and is deflected downward into the air-chamber 7 whence it escapes through the opening O and is forced by the rasps Q of the huller L around within the drum N and is more or less hulled.

The material is thrown by the huller L out of the lower side of the opening O and drops through the conveyer 24 on to the inclined floor 25, and is carried by the cross bars 26 of said conveyer up to the top of said floor and dumped into the chaffer 27. The hulled seeds pass through the sieve 28 on to the inclined floor 29 and thence to the trough 30 to be conveyed away by the screw 31. The strength of the current of air escaping from the spout 14 will carry the unhulled clover seeds in the direction described, and the refractory bodies will be caused by gravity to slide down the plate 11 and to fall down on to the floor 25, some being carried up with the seed and deposited in the chaffer and others falling into the corner 32. Carried by the support 10 is a plate 33 which extends for the full width of the machine and is of sufficient length to prevent the bodies of refractory material passing between the same and the drum 13 passing through the opening O into the huller L. As is well-known, the chaff has to be passed several times through the huller L, and any of the refractory bodies that are passed into the chaffer 27 are in due course deposited on the conveyer and separated from the unhulled seeds after the manner before set forth.

34 is the usual blower or fan mounted within the drum 35 whereby a current of air is passed through the chaffer 27.

The bottom 2 of the air-box 3 extends for the full width of the stemmer J and the same is secured by the nuts and bolts designated by the common numeral of reference 36 to the end boards 37 which are also secured by the said means to the said stemmer. As the bottom 2 is spaced apart from the bottom of the stemmer J, a passageway is formed between these members through which the current of air may escape from the air-chest 7.

From my experiments, I have found that it is absolutely essential to provide some means for permitting the escape of the current of air after it has carried the unhulled clover seed to the huller L, because if the air-box 3 or its equivalent be not provided, the hopper leading to the huller would become filled with air and consequently the fan or blower mounted in the drum 13 could not pass more thereinto and consequently the device would not be operative.

The top of the plate 11 is spaced far enough apart from the bottom 2 of the air-box, so as to provide a space of sufficient width to permit a blast of air from the drum 13 to convey the unhulled clover seed into the hopper leading to the huller. The unhulled seed is blown against the bottom 2 and is deflected downward into the hopper leading to the huller. It will be therefore understood by one skilled in this art, that the construction already described causes the unhulled seed to drop into the huller, and permits the current of air which carried said seed into the hopper leading to said huller, to escape from the top of said hopper to the forward end of the machine through the air-box 3. The floor of this air-box separates the current of air passing into the said hopper from the drum 13, and the current of air escaping from the top of said hopper from said air-box, and therefore these two currents of air cannot conflict. Without the presence of the said air-box, there would be no distinctive current of air passing from the hopper leading to the said huller, and consequently in order that my invention may be operative the said air-box or its equivalent must be provided.

From the foregoing specification it is clear to one skilled in this art that the current of air forced out of the drum 13 through the unhulled clover seed as it passes from the conveyer K, absolutely separates all refractory bodies from the seed, thereby preventing the damaging of the huller L from this source.

My invention can be applied to existing clover hullers, and from exhaustive experiments carried on under practical conditions with my own clover huller, I find that the same is certain in its operation.

The straw-rack I, stemmer J and conveyer K are suspended by the usual link-rods $a$ from the frame of the machine. The plates R and 11 are provided respectively with slots $c$ and $d$ through which pass the rod 4, and the plate T is also provided with a slot $e$ (shown dotted) through which the rod V operates.

While I have described what I consider to be the best embodiment of my invention, I desire it to be understood that the principle can be embodied in different forms, and I desire not to be limited beyond the requirements of the prior art and the terms of my claims.

What I claim as my invention is:

1. In a clover-huller, the combination with the conveyer; means for operating the same; the huller operating within its drum, and a suitable hopper for said huller, of a plate supported beyond the front end of said conveyer and positioned at the required angle; a blower functionally intermediate the front of said conveyer and the said plate, whereby a current of air is blown through the unhulled clover seed as it passes from said conveyer, blowing the same against and over said plate into the hopper leading to said huller, and means for permitting the escape of the air from said hopper, as set forth and for the purpose specified.

2. In a clover-huller, the combination with the conveyer; means for operating the same; the huller operating within its drum, and a suitable hopper for said huller, of a plate supported beyond the front end of said conveyer and positioned at the required angle; a blower functionally intermediate the front of said conveyer and the said plate, whereby a current of air is blown through the unhulled clover as it passes from said conveyer, blowing the same against and over said plate into the hopper leading to said huller; means for permitting the escape of the air from said hopper, and a plate supported by said machine between said blower and said huller whereby the refractory bodies as they are separated from the unhulled clover are prevented from passing into said huller.

3. In a clover huller, the combination with the stemmer; means for operating the same; the conveyer; means for operating the same, and the huller, operating within its drum, of a drum open at each end to permit the necessary air supply, supported within said machine, and provided with a discharge spout; means within said drum for creating a current of air; a plate supported at an upward-outward angle by said machine in advance of the front end of said conveyer and the discharge spout of the said drum; a hopper for said huller; a plate positioned intermediate said drum and said huller to prevent the passage of the separated bodies of refractory material into said huller, and an air-box carried by said stemmer, whereby the current of air escapes from the upper part of the hopper for said huller, the whole being arranged and set forth for the purposes specified.

4. In a clover huller, the combination with the stemmer; means for operating the same; the conveyer; means for operating the same, and the huller, operating within its drum, of a drum open at each end to permit the necessary air supply, supported within said machine and provided with a discharge spout; means within said drum for creating a current of air; a plate supported at an upward-outward angle by said machine in advance of the front end of said conveyer and the discharge spout of the said drum; a hopper for said huller, the same provided with a forward flexible wall which is supported at its upper end by said stemmer; a plate positioned intermediate said drum and said huller to prevent the passage of the separated bodies of refractory material into said huller, and an air-box carried by said stemmer, whereby the current of air escapes from the upper part of the hopper for said huller, the whole being arranged as set forth and for the purpose specified.

In testimony whereof I have affixed my signature in presence of two witnesses.

MARMADUKE KING.

Witnesses:
DOROTHY KING,
S. C. I. THACHER.

Copies of this patent may be obtained for five cents each, by addressing the "Commissioner of Patents, Washington, D. C."